United States Patent Office 2,744,852

Patented May 8, 1956

2,744,852

MEDICINAL COMPOSITION CONTAINING DIPHENYL DIHYDRO OR TETRAHYDROGLYOXALINE-4-ONE AND METHOD OF PRODUCING ANTICONVULSANT ACTIVITY

Louis S. Goodman, Salt Lake City, Utah

No Drawing. Application October 21, 1953, Serial No. 387,519

4 Claims. (Cl. 167—65)

This invention relates to a medicinal composition having anticonvulsant activity and a method of producing anti-convulsant activity in human beings.

More specifically, this invention relates to a medicinal composition having anticonvulsant activity and which contains 5,5-diphenyl-tetrahydroglyoxaline-4-one having the structural formula shown at (a) below or 5,5-diphenyl-$\Delta^{1,2}$-dihydroglyoxaline-4-one having the structural formula shown at (b) below:

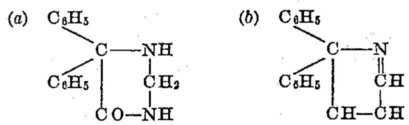

Equivalently, acid addition salts of these compounds can be used.

Again, more specifically, the method in accordance with this invention relates to the production of anticonvulsant activity in human beings with 5,5-diphenyl-tetrahydroglyoxaline-4-one or 5,5-diphenyl-$\Delta^{1,2}$-dihydroglyoxaline-4-one or an acid addition salt of one of these compounds.

5,5-diphenyl-tetrahydroglyoxaline-4-one is readily produced by the procedure of the following example:

*Example 1*

A solution of benzil (12.5 g.) and thiourea (10 g.) in ethanol (250 cc.) containing potassium hydroxide (3 g.) was refluxed for three hours, the reaction mixture was then diluted with water (1500 cc.) and a small quantity of suspended solid was removed by filtration. Acidification of the filtrate by the addition of 2 N hydrochloric acid gave rise to 5,5-diphenyl-2-thiohydantoin (17 g.) which separated from ethyl alcohol in small, almost colorless needles, m. p. 234° C.

A solution of 5,5-diphenyl-2-thiohydantoin (5 g.) in ethanol (125 cc.)) containing Raney nickel (25 g.) was heated under a reflux for 5 hours and the warm reaction filtered. Evaporation of the filtrate to approximately 25 cc. followed by the addition of a few drops of water furnished 5,5-diphenyl-tetrahydroglyoxaline-4-one (3.0 g.) which was purified from methanol to give stout, colorless plates, m. p. 183° C.

5,5-diphenyl-$\Delta^{1,2}$-dihydroglyoxaline-4-one is readily produced by the procedure set forth in the following example:

*Example 2*

A solution of 10 grams of 5,5-diphenyl-tetrahydroglyoxaline-4-one in 300 cc. of warm 0.7 N hydrochloric acid was added slowly with stirring to 400 cc. of 2 N sodium hydroxide solution. The resulting mixture was diluted with 600 cc. of water and warmed to 55° C. To this mixture was added dropwise (10 minutes) with stirring a solution of 4 grams of potassium permanganate in 200 cc. of warm water. After stirring for an additional 5 minutes the warm mixture was filtered. To the filtrate was added a solution of 100 grams of sodium acetate in 400 cc. of water. After cooling to 0° C., the pH was adjusted to 6.0–6.5 with dilute hydrochloric acid and the product removed by filtration. Crystallization from ethyl acetate gave a white crystalline product, M. P. 167.5–168.5° C.

Acid addition salts of the selected free base, such as the hydrochloride, sulfate or phosphate, can readily be made by dissolving the free base in the selected acid and evaporating to dryness in vacuo.

The pharmaceutical preparation in accordance with this invention will preferably be in the form of a tablet or hard gelatin capsule. The 5,5-diphenyl-tetrahydroglyoxaline-4-one or 5,5-diphenyl-$\Delta^{1,2}$-dihydroglyoxaline-4-one, or the equivalent thereof, will be admixed with a carrier or diluent such as, for example, starch, talc, lactose, stearic acid or gelatin. Similarly, the carrier or diluent may include a time delay material such as glyceryl distearate or glyceryl monostearate alone or with a wax.

Numerous other pharmaceutical forms may be utilized. For example, when the carrier is in liquid form, a soft gelatin capsule can be used. Peanut oil, olive oil, sesame oil and water are exemplary of liquid carriers or diluents.

Irrespective of the pharmaceutical form selected, a dosage unit of the preparation in accordance with this invention will contain 100 to 600 mgms. of 5,5-diphenyl-tetrahydroglyoxaline-4-one or 5,5-diphenyl-$\Delta^{1,2}$-dihydroglyoxaline-4-one, or a salt of one of these compounds and 25 to 200 mgms. of the carrier or diluent. The following examples are illustrative:

*Example 3*

| | Mgms. |
|---|---|
| 5,5-diphenyl-tetrahydroglyoxaline-4-one | 350 |
| Lactose | 50 |

The above ingredients were thoroughly mixed and placed in a hard gelatine capsule.

*Example 4*

| | Mgms. |
|---|---|
| 5,5-diphenyl-tetrahydroglyoxaline-4-one | 200 |
| Starch | 45 |
| Talc | 5 |

The above ingredients were thoroughly mixed, granulated using a 10% gelatin solution, and formed into a tablet.

*Example 5*

| | Mgms. |
|---|---|
| 5,5-diphenyl-tetrahydroglyoxaline-4-one | 100 |
| Peanut oil | 200 |

The above ingredients were thoroughly mixed and placed in a soft gelatin capsule.

*Example 6*

| | Mgms. |
|---|---|
| 5,5-diphenyl-tetrahydroglyoxaline-4-one hydrochloride. | 350 |
| Lactose | 50 |

*Example 7*

| | Mgms. |
|---|---|
| 5,5-diphenyl-$\Delta^{1,2}$-dihydroglyoxaline-4-one | 350 |
| Lactose | 60 |

*Example 8*

| | Mgms. |
|---|---|
| 5,5-diphenyl-$\Delta^{1,2}$-dihydroglyoxaline-4-one | 225 |
| Starch | 50 |

*Example 9*

| | Mgms. |
|---|---|
| 5,5-diphenyl-$\Delta^{1,2}$-dihydroglyoxaline-4-one sulfate | 350 |
| Lactose | 50 |

*Example 10*

| | Mgms. |
|---|---|
| 5,5-diphenyl-$\Delta^{-1,2}$-dihydroglyoxaline-4-one | 500 |
| Sesame oil | 500 |

The method in accordance with this invention comprises administering internally the above described medicinal composition to a human being to produce anticonvulsant activity. Oral administration is preferred.

This application is a continuation-in-part of application Serial No. 368,524, filed July 16, 1953, now abandoned.

What is claimed is:

1. A pharmaceutical preparation having anticonvulsant activity, in dosage unit form, comprising a pharmaceutical carrier and as the added active medicament about 100–600 mgms. of a member selected from the group consisting of 5,5-diphenyltetrahydroglyoxyaline-4-one and 5,5-diphenyl-$\Delta^{-1,2}$-dihydroglyoxaline-4-one.

2. The composition defined in claim 1, wherein the dosage unit form is a tablet.

3. The composition defined in claim 1, wherein the dosage unit form is a capsule.

4. The method of producing anticonvulsant activity in a human being which comprises orally administering to a human being a pharmaceutical carrier and from about 100 to 600 mgms. of a member selected from the group consisting of 5,5-diphenyl-tetrahydroglyoxaline-4-one and 5,5-diphenyl-$\Delta^{-1,2}$-dihydroglyoxaline-4-one.

References Cited in the file of this patent

Biltz: Chemical Abstracts, vol. 6 (1912), column 3277.

May et al.: May's Chemistry of Synthetic Drugs, page 30, 4th ed., Longmans, Green and Co., N. Y., 1939.

Burger: Medicinal Chemistry, vol. 1, Interscience, 1951, N. Y., page 144.